United States Patent Office 3,147,278
Patented Sept. 1, 1964

3,147,278
EPOXY COMPOUNDS OBTAINED BY REACTING A PHENOL AND A 1,1-(2'-OLEFINIC-CYCLIC ACETAL)-CYCLOHEXENE-3
Daniel Porret, Basel, and Hans Batzer, Arlesheim, Switzerland, assignors to Ciba Limited, Basel, Switzerland, a company of Switzerland
No Drawing. Filed Mar. 27, 1961, Ser. No. 98,325
Claims priority, application Switzerland Mar. 29, 1960
3 Claims. (Cl. 260—340.7)

The present invention provides new epoxy compounds of the general formula (I)
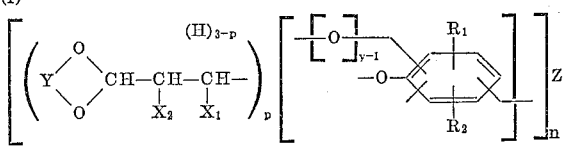

where $R_1$ and $R_2$ each represents a hydrogen or halogen atom, or an alkyl or alkoxy group, or together represent a condensed aromatic ring; $X_1$ and $X_2$ each represents a hydrogen atom or a methyl group; Y represents the radical of a dihydric alcohol that contains at least one epoxide group; $y=1$ or 2; $p=1$, 2 or 3; and $n$ is a small number, advantageously 1 or 2; and Z represents a hydrogen atom or an aliphatic radical having $n$ free valencies.

According to the present invention the new compounds are obtained by treating an acetal of the general formula (II)
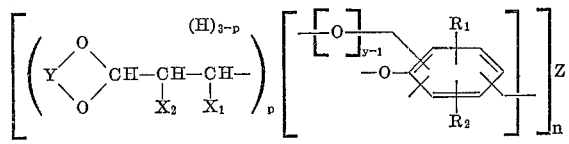

where $R_1$, $R_2$, $X_1$, $X_2$, Z, $n$, $p$ and $y$ have the same meanings as in Formula I and Y' represents the radical of a dihydric alcohol that contains at least one epoxidizable group—with an epoxidizing agent.

The term "epoxidizable group" signifies above all an epoxidizable carbon-to-carbon double bond. By treatment with, for example, an organic per-acid such carbon-to-carbon double bonds can be epoxidized to form the 1:2-epoxide group.

The term "epoxidizable group" further refers to the halohydrin grouping

where "hal" stands for a halogen atom. As is known, such a halohydrin group can likewise be converted into a 1:2-epoxide group by treatment with a dehydrohalogenating agent.

The acetals of the Formula II used as starting material in the present process are obtained most easily by adding on to 1 molecular proportion of a phenol of the formula (III)
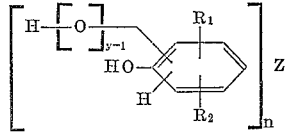

where $R_1$, $R_2$, Z, $n$ and $y$ have the same meanings as in the Formula I—(n.p) molecular proportions of an unsaturated acetal of the formula (IV)
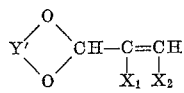

Suitable phenols of the Formula III are monophenols and polyphenols.

As monophenols there may be mentioned ortho-, meta- and para-cresol, 2:3-xylenol, 2:5-xylenol, 3:4-xylenol, guaiacol, α-naphthol, β-naphtol, ortho-, meta- and parachlorophenol, dichlorophenol and more especially phenol itself.

As diphenols and polyphenols there may be mentioned: Hydroquinone, resorcinol; bis-[hydroxyphenyl]-methane, bis - [hydroxyphenyl] - phenyl-methane, bis-[4-hydroxyphenyl]-tolylmethane, chlorinated phenols such as bis-[3-chloro - 4-hydroxy-phenyl]-dimethylmethane; condensation products of phenols, such as cresol or phenol, with formaldehyde, 1:1:3-tris-[4'-hydroxyphenyl] - propane, 1:1:2-tris-[4'-hydroxy - 3':5' - dimethylphenyl]-propane, 1:1:2:2 - tetrakis - [4-hydroxy-phenyl]-ethane, 1:1:3:3-tetrakis-[4-hydroxyphenyl]-propane, 1:1:3:3-tetrakis-[3-chloro-4-hydroxyphenyl]-propane, α:α:α':α'-tetrakis-[4''-hydroxyphenyl]-1:4-dimethylbenzene, α:α:α':α'- tetrakis-[4''-hydroxyphenyl]-1:4-diethylbenzene and more especially bis-[4-hydroxyphenyl]-dimethylmethane.

The unsaturated acetals of the Formula IV in their turn are easy to prepare by acetalizing crotonic aldehyde, methacrolein or more especially acrolein with an epoxidizable or unsaturated diol.

As such unsaturated polyols there may be mentioned, for example, butene-(2)-diol-1:4, glycerol monoallyl ether, butanetriol-(1:2:4)-monoallyl ether and the like, and more especially diols of the formula V)
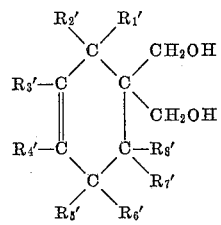

where $R_1'$ to $R_8'$ each represents a monovalent substituent, such as a hydrogen or a halogen atom, an alkoxy group or an aliphatic, cycloaliphatic, araliphatic or aromatic hydrocarbon radical, more especially an alkyl radical containing 1 to 4 carbon atoms; $R_1'$ and $R_5'$ together may also represent an alkylene radical, such as a methylene group. As such diols (V) there may be mentioned, for example: 1:1 - bis-[hydroxymethyl]-2:4:6-trimethyl-cyclohexene-(3), 1:1-bis-[hydroxymethyl]-2:5-endomethylene-cyclohexene-(3), 1:1-bis-[hydroxymethyl]-4-chlorocyclohexene-(3) and more especially 1:1-bis-[hydroxymethyl]-cyclohexene-(3) and 1:1-bis-[hydroxymethyl]-6-methyl-cyclohexene-(3).

The acetalization can be performed in the known manner, for example by heating an aldehyde of the formula (VI)
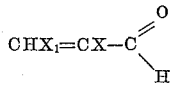

together with a diol in the presence of an acid catalyst such, for example, as hydrochloric acid or para-toluenesulfonic acid.

The addition of the unsaturated acetal (IV) on to the phenol (III) is performed in the presence of an acid catalyst or of a Lewis acid such, for example as sulfuric acid, boron trifluoride or para-toluenesulfonic acid.

It is known that under such conditions it is easy to add alcohols and glycols with their hydroxyl groups on to the double bonds of acetals from unsaturated aldehydes (VI). As was to be expected, the addition on to phenolic hydroxyl groups proceds likewise smoothly, but in the case of phenols the unexpected occurs in that more than one molecular proportion of the acetal undergoes reaction with every phenolic hydroxyl group; this means that some of the acetal radicals migrate towards the benzene nucleus, more especially in ortho-position relatively to the phenolic hydroxyl group. Phenol itself will form adducts, for example, with up to 3 molecular proportions of acetal. When less than 3 molecular proportions of acetal is added on, some of the acetal is added on via the oxygen of the phenolic hydroxyl, while the remainder is bound directly with the benzene nucleus.

According to the present process an acetal of the Formula II, which contains at least one epoxidizable group, such as an epoxidizable carbon-to-carbon double bond or a halohydrin group, is treated with an epoxidizing agent.

The epoxidation of the carbon-to-carbon double bonds giving rise to the compounds of the present invention is carried out by a conventional method, preferably with the aid of an organic per-acid such as peracetic acid, perbenzoic acid, peradipic acid, monoperphthalic acid or the like. Another suitable epoxidizing agent is hypochlorous acid; in this case in the first stage of the process HOCl is added on to the double bond and in the second stage the epoxide group is formed under the action of an agent capable of splitting off hydrochloric acid, for example a strong alkali.

In conformity with the above definition of the term "radical containing an epoxidizable group" the treatment according to the invention with epoxidizing agents includes also the treatment with an agent capable of splitting off hydrogen halide such as the treatment with potassium hydroxide or sodium hydroxide of halohydrin groups, for example the glycerol monochlorohydrin group, leading to the formation of the corresponding 1:2-epoxide group or of a glycidyl group.

The epoxidation may yield in addition to the diepoxides or polyepoxides also wholly or partially hydrolyzed epoxides resulting from side reactions, that is to say compounds in which the epoxide groups of the polyepoxide of the Formula I have been wholly or partially hydrolyzed to hydroxyl groups.

It has been observed that as a rule the presence of such by-products has an advantageous effect on the technical properties of the cured polyepoxides, and it is therefore in general of advantage not to isolate the pure polyepoxides from the reaction mixture.

The epoxidized acetals of the present process react with the conventional curing agents for epoxy compounds; they can therefore be crosslinked or cured in the same manner as other monofunctional or polyfunctional epoxy compounds or epoxy resins by adding such curing agents. Particularly suitable curing agents are basic or more especially acid compounds.

Good results have been achieved with amines or amides, such as aliphatic and aromatic primary, secondary and tertiary amines, for example mono-, di- and tributylamines, para - phenylenediamine, bis - [para-aminophenyl]-methane, ethylenediamine, N:N - diethylethylenediamine, N:N - dimethylpropylenediamine, diethylenetriamine, tetra - [hydroxyethyl] - diethylenetriamine, triethylenetetramine, tetraethylenepentamine, trimethylamine, diethylamine, triethanolamine, Mannich's bases, piperidine, piperazine, guanidine and guanidine derivatives such as phenyldiguanidine, diphenylgnuanidine, dicyandiamide; anilineformaldehyde resins, urea-formaldehyde resins, melamineformaldehyde resins, polymers of aminostyrenes, polyamides, for example those prepared from aliphatic polyamines and dimerized or trimerized unsaturated fatty acids, isocyanates, isothiocyanates; polyhydric phenols, for example resorcinol, hydroquinone, bis-[4-hydroxyphenyl] - dimethylmethane, quinone, phenolaldehyde resins, oil-modified phenolaldehyde resins, reaction products of aluminum alcoholates or phenolates with compounds of tautomeric reaction of the type of acetoacetic ester, Friedel-Crafts catalysts, for example aluminium trichloride, antimony pentachloride, tin tetrachloride, zinc chloride, boron trifluoride and complexes thereof with organic compounds, or phosphoric acid. Preferred curing agents are polybasic carboxylic acids and anhydrides thereof, for example phthalic anhydride, methylendomethylenetetrahydrophthalic anhydride, dodencyl-succinic anhydride, hexahydrophthalic anhydride, hexachloroendomethylenetetrahydrophthalic anhydride or endomethylene-tetrahydrophthalic anhydride, or mixtures thereof; or maleic or succinic anhydride. If desired, there may be used additionally an accelerator such as a tertiary amine, or a strong Lewis base, such, for example as an alkali metal alcoholate, and advantageously a polyhydroxyl compound such as hexanetriol or glycerol.

It has now been found that it is of advantage to perform the curing of the epoxy resins according to the invention with carboxylic acid anhydride with the use of only about 0.3 to 0.9 gram equivalent of anhydride groups per gram equivalent of epoxide groups. When a basic accelerator, such as an alkali metal alcoholate or an alkali salt of a carboxylic acid, is used, up to 1.0 gram equivalent of anhydride groups may be used.

The term "curing" as used in this connection signifies the conversion of the aforementioned epoxy compounds into insoluble and infusible resins.

Accordingly, another object of the present invention are curable mixtures containing the epoxidized acetals of the present process as well as a curing agent for epoxy resins, advantageously a dicarboxylic or polycarboxylic acid anhydride.

The curable mixtures of the present invention further contain with advantage a proportion of suitable acetals, the epoxide groups of which are however wholly or partially hydrolyzed to hydroxyl groups and/or other crosslinking polyhydroxyl compounds, such as hexanetriol.

The new monoepoxy and polyepoxy compounds may further serve as active diluent or modifying agent for the known epoxy resins such, for example, as mono- or polyglycidyl ethers of mono- or polyalcohols such as butyl alcohol, 1:4-butanediol or glycerol, or monophenols or polyphenols such as resorcinol, bis-[4-hydroxyphenyl]-dimethylmethane or condensation products of aldehydes with phenols (novolaks); furthermore polyglycidyl esters of polycarboxylic acids such as phthalic acid; furthermore aminopolyepoxides such as are obtained for example by dehydrohalogenating reaction products of epihalohydrins and primary or secondary amines, such as n-butylamine, aniline or 4:4'-di-(monomethylamino)-diphenylmethane.

Furthermore, the epoxy compounds of the invention and mixtures thereof with curing agents may also be treated with a filler, plasticiser, coloring matter or the like at any stage prior to the curing operation. Suitable extenders and fillers are, for example, asphalt, bitumen, glass fibers, mica, quartz meal, cellulose, kaolin, finely dispersed silicic acid (Aerosil) or metal powders.

The mixtures consisting of the epoxy compounds of the invention and curing agent, and if desired a filler, may be used in the form of solutions or emulsions, as textile assistants, laminating resins, paints, lacquers, dipping resins, casting resins, coating compositions, pore fillers, putties, adhesives, moulding compositions and the like, as well as for the manufacture of such products. The new resins are used with special advantage as insulating compounds in the electric industry.

In the following examples parts and percentages are by weight and the relationship between part by weight and part by volume is the same as that between the kilogram and the liter.

*Example 1*

(A) *Acetal from acrolein and 1:1-bis-[hydroxymethyl]-cyclohexene-3.*—A mixture of 118 parts of acrolein, 286 parts of 1:1-bis-[hydroxymethyl]-cyclohexene-3 and 3 parts by volume of sulfuric acid of 50% strength is heated for 20 minutes at 50° C. When all has passed into solution, 700 parts by volume of benzene and 2 parts of para-toluenesulfonic acid are added and the whole is boiled for 40 minutes in a circulation distillation apparatus until 40 parts of water have distilled off azeotropically. The solution is treated with 4 parts of anhydrous sodium carbonate, filtered and evaporated. After the benzene has been expelled, there pass over at 54 to 61° C. under a vacuum of 0.2 mm. Hg 319 parts of acetal (3-vinyl-2:4-dioxospiro(5:5)-undecene-9) corresponding to a yield of 87% of the theoretical. 40 parts of an unidentified substance remains as residue.

(B) *Additive combination with phenol.*—378 parts (2.1 mols) of the acetal prepared according to Example 1(A) and 94 parts of phenol (1 mol) are heated to 80° C. in a flask equipped with stirrer and thermometer. 2 parts of para-toluenesulfonic acid are then added. An exothermic reaction sets in which lasts for about 1 hour. While the reaction is proceeding, the temperature is maintained between 85 and 90° C. by moderate cooling; the reaction mixture is then maintained for one hour longer at the same temperature by heating. The mixture is then left to itself for one hour, then mixed with 2.5 parts of sodium carbonate and the volatile constituents are distilled off in a high vacuum; in this manner 30 parts of unreacted acetal are recovered and there remain 430 parts of a very viscous dark liquid (Product A). As revealed by the determination of the hydroxyl group this product is a mixture of about 70% of the compound of the formula

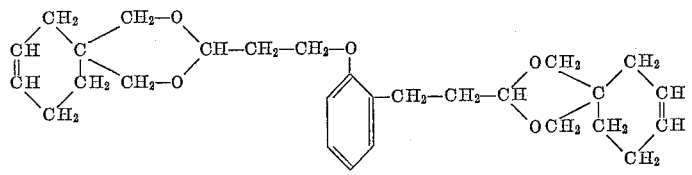

and 30% of the compound of the formula

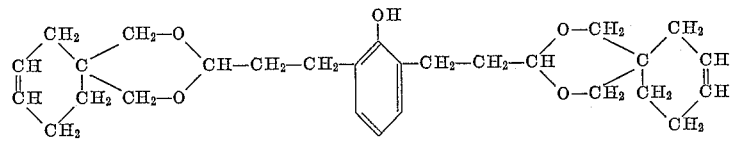

By prolonged heating with an excess of acetal up to 3 mols of acetal can be added on to each mol of phenol.

(C) *Epoxidation.*—A solution of 430 parts of the adduct (Product A) obtained as described in Example 1(B) in 1160 parts of benzene is treated with 18 parts of anhydrous sodium acetate and in the course of 30 minutes 368 parts of peracetic acid of 44.2% strength are then vigorously stirred in dropwise. An exothermic reaction sets in which lasts for one hour and during its course the temperature is maintained between 33 and 35° C. by cooling. When the cooling bath is removed the temperature drops within another 2 hours to 27° C. By this time the oxidant has been consumed to an extent of 100% of the theoretical.

The aqueous layer is separated and the benzene layer is washed with 3 x 200 parts of water and then neutralized by washing with 200 parts of water containing 25 parts of sodium hydroxide solution of 30% strength. The benzene is then distilled off under a partial vacuum and the reaction mixture is freed from the last remnants of solvent by being treated at 120° C. under a pressure of 0.2 mm. Hg. In this manner there obtained 434 parts of a light-yellow resin which is solid at room temperature and contains 3.9 epoxide equivalents per kg., corresponding to 94% of the theoretical content. When cured with an acid anhydride, this resin forms a light-yellow casting resin having good mechanical properties.

*Example 2*

(A) *Additive combination with para-cresol.*—As described in Example 1(B) a mixture of 81 grams of para-cresol (0.75 mol) and 405 parts (2.25 mols) of the acetal prepared as described in Example 1(A) is heated to 80° C., then treated with 2.5 parts of para-toluenesulfonic acid and maintained for 4 hours at 83 to 88° C., at first with slight cooling and subsequently by heating. The reaction mixture is then neutralized with 3 parts of sodium carbonate, whereupon at 60° C. under a pressure of 0.2 mm. Hg 86 parts of unreacted acetal are distilled off. There remain 402 parts of a dark substance (Product B) which is highly viscous when cold. This yield shows that 2.3 mols of acetal have been added on to 1 mol of para-cresol. As revealed by the determination of the hydroxyl group, there are still about 25% of free phenol groups left.

(B) *Epoxidation.*—A solution of 400 grams of the adduct (Product B) obtained as described in Example (A) in 1080 parts of benzene is treated with 16 parts of anhydrous sodium acetate and 335 parts of peracetic acid of 44.2% strength are vigorously stirred in dropwise in the course of 35 minutes. During the dropwise addition of the peracetic acid and for one hour longer the temperature is maintained by cooling at 33 to 35° C. The mixture is then stirred for one hour longer with the temperature droping to 30° C. By this time the oxidant has been consumed to an extent corresponding to 96% of the theoretical. The aqueous layer is then separated, and the benzene layer is washed and neutralized as described in Example 1(C). The solvent is then distilled off. The last remnants of volatile constituents are removed at 124° C. under 0.2 mm. Hg pressure. Yield: 397 parts of a yellow resin which is solid at room temperature and contains 3.66 epoxide equivalents per kg. When this resin is cured with 0.7 equivalent of phthalic anhydride per epoxide equivalent for 24 hours at 140° C., a casting resin is obtained which has a thermostability according to Martens of 160° C. and possesses good mechanical properties.

*Example 3*

(A) *Additive combination with bisphenol A.*—As described in Example 1(B) a mixture of 114 parts of bis-[hydroxyphenyl]-dimethylmethane (bisphenol A) and 360 parts of the acetal prepared as described in Example 1(A) is heated to 80° C. 2 parts of para-toluene-sulfonic acid are then added, whereupon an exothermic reaction sets in. The temperature is maintained for a total of 3½ hours between 85 and 89° C., in the beginning by cooling and later on by heating. 2 parts of sodium carbonate are then added and 17 parts of unreacted acetal are distilled off at 65° under 0.03 mm. Hg pressure, to yield 417 parts of a very viscous reaction product (Product C) in which about 3.8 mols of acetal are additively combined with every mol of bisphenol A. As revealed by the determination of the hydroxyl group the product still contains about 50% of free phenolic hydroxyl groups; that is to say that about half the acetal residues are fixed through oxygen bridges to benzene nuclei, while the other half is directly attached through carbon atoms to benzene nuclei, in the first place in ortho-position relatively to the hydroxyl group. Depending upon the reaction conditions employed it is possible to add on more acetal residues, in fact up to 6 mols for every mol of bisphenol A.

(B) *Epoxidation.*—A solution of 412 parts of the adduct (Product C) obtained as described in Example 3(A) in 1110 parts of benzene is treated with 18 parts of anhydrous sodium acetate and in the course of 30 minutes 360 parts of peracetic acid of 44.2% strength are vigorously stirred in drop by drop, while maintaining the temperature by cooling for one hour at 33 to 35° C. The mixture is then stirred on for 1½ hours, during which the temperature drops to 28° C. By that time the reaction is completed and 96% of the oxidant has been consumed. The aqueous layer is separated, the benzene layer is washed three times with water, then neutralized, as described in Example 1(C), by being washed with dilute sodium hydroxide solution and then once more with water. The benzene is evaporated and the last remnants of volatile substances are removed at 140° C. under a pressure of 0.2 mm. Hg. Yield: 415 parts of a light-yellow epoxy resin which is solid at room temperature and contains 3.44 epoxide equivalents per kg.

(C) *Curing.*—A mixture of 100 parts of the above product and 46.5 parts of phthalic anhydride is heated to 120° C. When all of the phthalic anhydride has passed into solution, the mixture is poured into aluminium moulds (40 x 10 x 140 mm.) and heated for 24 hours at 140° C. The resulting light-yellow cast sheets possess a thermostability according to Martens of 180° C. and a bending strength of 6.5 kg./mm.².

*Example 4*

(A) *Acetal from acrolein and 1:1-bis-[hydroxymethyl-6-methylcyclohexene-3.*—A mixture of 56 parts of acrolein, 157 parts of 1:1-bis-[hydroxy-methyl]-6-methyl-cyclohexene-3 and 1 part of sulfuric acid of 50% strength is heated on a water bath at 40° C. until all has passed into solution. An exothermic reaction sets in so that after the water bath has been removed the temperature rises to 50° C. 350 parts by volume of benzene are then added and the mixture is boiled for 40 minutes in a circulation distillation apparatus until 20 parts of water have distilled off azeotropically. The solution is treated with 2 parts of anhydrous sodium acetate, filtered and evaporated. After the benzene has been expelled, there pass over at 81° C. under a pressure of 0.5 mm. Hg 163 parts of acetal [3-vinyl-7-methyl-2:4-dioxospiro(5:5)undecene-9] which is equivalent to a yield of 83.6% of the theoretical. There remain 27 parts of an unidentified residue.

(B) *Additive combination with phenol.*—A mixture of 71 parts of phenol and 320 parts of the acetal obtained as described in Example 4(A) is heated to 80° C. and 2 parts of para-toluenesulfonic acid are then added, whereupon an exothermic reaction sets in. The temperature is maintained for 2½ hours between 85 and 90° C., first by cooling and then by heating, 2 parts of sodium carbonate are then added and 7 parts of unreacted acetal are distilled off at 43° C. under 0.2 mm. Hg pressure, to leave 367 parts of a very viscous reaction product (Product D).

(C) *Epoxidation.*—A solution of 360 parts of the adduct (Product D) obtained as described in Example 4(B) in 970 parts of benzene, is treated with 16 parts of sodium acetate and in the course of 35 minutes 307 parts of peracetic acid of 44.2% strength are then thoroughly stirred in drop by drop. During the dropwise addition and then for another 2 hours the temperature is maintained between 33 and 35° C., at first by cooling and then by heating. By that time 97% of the theoretical amount of the oxidant has been consumed. The aqueous layer is separated, washed and the benzene layer is then neutralized as described in Example 1(C). The solvent is then distilled off and the last remnants of benzene are removed at 124° C. under 0.2 mm. Hg pressure. Yield: 346 parts of a yellow epoxy resin which is solid at room temperature and contains 3.28 epoxide equivalents per kg. This resin can be cured with acid anhydride to form light-yellow castings possessing good mechanical properties.

*Example 5*

(A) *Acetal from acrolein and 1:1-bis-(hydroxymethyl)-2:5-endomethylene-cyclohexene-3.*—A reactor is charged with 156 parts of 1:1-bis-(hydroxymethyl)-2:5-endomethylene-cyclohexene-3, 62 parts of acrolein and 1 part of sulfuric acid of 50% strength and the mixture is heated to 50° C., whereupon all passes into solution, 300 parts of benzene are then added and the water of reaction formed is distilled off azeotropically. After 45 minutes the theoretical amount of water has separated out, 2 parts of anhydrous sodium carbonate are added and first the benzene and then the resulting acetal are distilled off. At 62° C. under a pressure of 0.2 mm. Hg there are obtained 177 parts of 3-vinyl-8:11-methylene-2:4-dioxospiro(5:5)-undecene-9 in the form of a colorless liquid. The yield amounts to 91.2% of the theoretical, calculated on 1:1-bis-(hydroxymethyl)-2:5-endomethylene-cyclohexene-3.

(B) *Additive combination with phenol.*—A mixture of 175 parts of the acetal prepared as described in Example 5(A), 34.5 parts of phenol and 1 part of concentrated sulfuric acid is heated for 8 hours at 90° C. After 3 hours and 6 hours one addition each of 0.5 part of concentrated sulfuric acid is made. After cooling, 2 parts of sodium carbonate are added and the resulting mixture is distilled. 51 parts of unreacted acetal are recovered and there are obtained as residue 143 parts of an adduct in the form of a dark liquid. According to this yield, about 2 mols of acetal have been added on to every mol of phenol.

(C) *Epoxidation.*—As described in Example 1(C), 140 parts of the adduct of Example 5(B) are epoxidized with 106 parts of peracetic acid of 43.8% strength in a solution in benzene and in the presence of sodium acetate for 3 hours at 35° C.; after working up the reaction mixture as described in Example 1(C) there are obtained 130 parts of a dark epoxy resin which solidifies on cooling and contains 2.06 epoxide equivalents per kg.

*Example 6*

The acetal from 1:1-bis-(hydroxymethyl)-cyclohexene-3 and methacrolein is prepared as described in Example 1(A), except that acrolein is replaced by an equivalent amount of methacrolein.

The addition of 2 mols of the resulting acetal on to 1 mol of phenol is carried out as described in Example 1 by heating the mixture for 9 hours at 90° C. in the presence of para-toluenesulfonic acid. The resulting adduct is a highly viscous liquid.

199 parts of the resulting adduct are epoxidized as described in Example 1 with 152 parts of peracetic acid of 43.8% strength as a solution in benzene and in the presence of sodium acetate. After having worked up the reaction product as described in Example 1 there are obtained 192 parts of a brownish red epoxy resin which is solid after having cooled. It contains 3.62 epoxide equivalents per kg.

*Example 7*

The acetal of 1:1-bis-(hydroxymethyl)-cyclohexene-3 is prepared as described in Example 1(A), except that acrolein is replaced by an equivalent amount of crotonic aldehyde. The addition of 2 mols of the resulting acetal on to 1 mol of phenol is brought about by heating the mixture for 8 hours at 98° C. in the presence of para-toluenesulfonic acid. The adduct is a viscous, dark liquid. When this product is epoxidized with peracetic acid as described in Example 1(C) there is obtained a brownish red, highly viscous epoxy resin which contains 3.6 epoxide equivalents per kg.

*Example 8*

A mixture of 60 parts of para-chlorophenol and 270 parts of the acetal described in Example 1(A) from acrolein and 1:1-bis-(hydroxymethyl)-cyclohexene-3, and 1 part of para-toluenesulfonic acid is heated for 7 hours at 94° C. After 4 hours a further part of para-toluenesulfonic acid is added. The whole is neutralized with 4 parts of anhydrous sodium carbonate, whereupon 29.5 parts of unreacted chlorophenol and 149 parts of unreacted acetal are distilled off, to leave 158 parts of an adduct in the form of a dark, viscous liquid. This adduct contains 4.3 double bonds per kg. (theory: 4.1).

The resulting adduct is epoxidized in the following manner: A solution of 170 parts of the product in 460 parts of benzene is treated with 8 parts of sodium acetate and in the course of 15 minutes at 35° C. 198 parts of peracetic acid of 43.8% strength are vigorously stirred in. The temperature is then maintained for another 3 hours at 35° C., at first with cooling and then with heating. By this time the theoretical amount of oxidant has been consumed. The product is then neutralized and concentrated as described in Example 1(C), to yield 163 parts of a highly viscous brownish red epoxy resin containing 3.60 epoxide equivalents per kg.

Example 9

A mixture of 72 parts of α-naphthol, 270 parts of the acetal from acrolein and 1:1-bis-(hydroxymethyl)-cyclohexene-3 described in Example 1(A), and 1.5 parts of para-toluene-sulfonic acid is heated for 4 hours at 90° C. The additive combination proceeds relatively quickly and it is observed that the reaction mixture heats up. On completion of the reaction the whole is cooled and treated with 1 part of sodium carbonate. 48 parts of unreacted acetal are then distilled off, to leave 283 parts of the adduct in the form of a dark, viscous liquid. Approximately 2.4 mols of acetal have entered an additive combination with 1 mol of α-naphthol.

A solution of 282 parts of the resulting adduct in 760 parts of benzene is treated with 11 parts of sodium acetate and in the course of 30 minutes at 35° C. 227 parts of peracetic acid of 43.8% strength are then added, whereupon the temperature is maintained at 35° C. for another 2½ hours. The reaction product is washed, neutralized and concentrated as described in Example 1(C), to yield 272 parts of a dark epoxy resin which is solid after cooling and contains 2.98 epoxide equivalents per kg.

Example 10

A mixture of 189 parts of the acetal described in Example 1(A) from 1:1-bis-(hydroxymethyl)-cyclohexene-3 and acrolein, 55 parts of hydroquinone and 0.2 part of sulfuric acid of 50% strength is heated for one hour at 90° C. A highly viscous, dark adduct is obtained.

A solution of 250 parts of the above adduct in 650 parts of benzene is treated with 10 parts of sodium acetate, heated to 35° C., and in the course of 30 minutes 190 parts of peracetic acid of 43.1% strength are thoroughly stirred in. The reaction mixture is then stirred for another 2½ hours at 35°. The product is then washed and concentrated as described in Example 1(C), to yield 195 parts of a solid resin containing 2.76 epoxide equivalents per kg. (=70% of the theoretical content). The product melts at 52 to 54° C. With the aid of phthalic anhydride it can be cured to form castings having good mechanical properties.

Example 11

37.5 parts of phthalic anhydride (0.65 equivalent of anhydride groups per equivalent of epoxide groups) are fused at 120 to 125° C. in 100 parts of an epoxy resin containing 3.9 epoxide equivalents per kg., prepared as described in Example 1(C).

The resulting mixture of resin and curing agent has at 120° C. a viscosity below 100 centipoises, which enables it to be used as casting, laminating or impregnating resin. A specimen of the above mixture of resin and curing agent is cast at 120° in an aluminium mould (40 x 10 x 140 mm.) and then cured for 24 hours. The cured specimen possess a bending strength of 8 kg./mm.² and a thermostability according to Martens DIN of 135° C.

Example 12

1.75 parts of a sodium alcoholate (obtained by dissolving 0.82 part of sodium metal at about 120° C. in 100 parts of 2:4-dihydroxy-3-hydroxymethylpentane) are dissolved at room temperature or a slightly higher temperature:

In a first test in 100 parts of an epoxy resin containing 3.9 epoxide equivalents per kg., prepared as described in Example 1(C), and in a second test in 100 parts of an epoxy resin containing 5.3 epoxide equivalents per kg., prepared by reacting bis-(4-hydroxyphenyl)-dimethylmethane with epichlorohydrin in the presence of an alkali.

In both tests 1.0 equivalent of phthalic acid anhydride per equivalent of epoxide groups is fused in at 120 to 130° C. as curing agent. The two casting resin mixtures obtained in this manner were cast at about 120° C. in aluminium moulds (40 x 10 x 140 mm.) and cured for 24 hours at 140° C.

As can be seen from the following comparison of the properties of the specimen 1 according to the invention with the known specimen 2, the former constitutes a substantial progress.

| Bending strength, kg./mm.²: | Thermostability according to Martens DIN in ° C. |
| --- | --- |
| Specimen 1, 9.7 | 156 |
| Specimen 2, 10 | 125 |

Example 13

27 parts of phthalic anhydride (0.45 equivalent of anhydride groups per equivalent of epoxide groups) are dissolved at 120 to 125° C. in 100 parts of an epoxy resin prepared as described in Example 9, which is solid at room temperature and contains 2.98 epoxide equivalent per kg.

One portion of the resulting casting resin mixture is cast at 120 to 125° in aluminium moulds (40 x 10 x 140 mm.) and cured for 24 hours at 140° C. The cured casting resin specimen has a thermostability according to Martens DIN of 139° C. Even after the specimen has been cured for a further 24 hours at 200° C. its thermostability is only little changed (136° C.), which means that the product has excellent resistance to ageing at extremely high temperatures.

Another portion of the above resin and curing agent mixture is used for making coatings. For this purpose the mixture is cast on sheets of glass in layers of 0.1 to 1 mm. thickness respectively and cured for 24 hours at 140° C. The films have a perfect surface and adhere excellently to the support. The cured films prove stable on immersion for one hour at room temperature in 2 N-sodium hydroxide solution, 2 N-sulfuric acid, water, acetone and chlorobenzene.

What is claimed is:
1. An epoxide obtained by first heating in the presence of an acidic catalyst 1 molecular proportion of a phenol selected from the class consisting of phenol, cresols, xylenols, monochlorophenols, dichlorophenols, naphthols, hydroquinone, resorcinol and bis(4-hydroxyphenyl)-dimethylmethane with (n.p) molecular proportions of an acetal of the formula

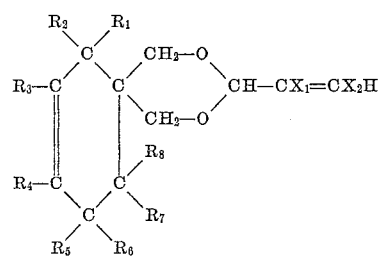

wherein $R_1$ and $R_5$ are selected from the group consisting of hydrogen, halogen, lower alkyl and together $R_1$ and $R_5$ form the methylene group, $R_2$, $R_3$, $R_4$, $R_6$, $R_7$ and $R_8$ each are a member selected from the group consisting of hydrogen and lower alkyl of 1 to 4 carbon atoms, $X_1$ and $X_2$ each are selected from the group consisting of hydrogen and methyl, $p$ is an integer of at least 1 and at the most 3, and $n$ is an integer of at least 1 and at the most 2 and equals the number of benzene nuclei which are present in the phenol molecule, and by subsequently epoxidizing the C=C-double bonds in the cyclohexene rings of the addition product obtained from the phenol and the acetal.

2. An epoxide obtained according to claim 1 wherein the phenol is phenol and the acetal is of the formula

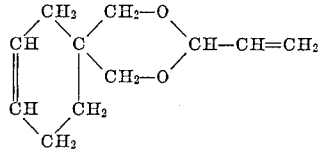

the reactants being heated in the molecular proportions of one molecular proportion of phenol to at least one and at most three molecular proportions of acetal.

3. An epoxide obtained according to claim 1 wherein the phenol is phenol and the acetal is of the formula

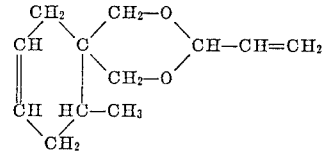

the reactants being heated in the molecular proportions of one molecular proportion of phenol to at least one and at most three molecular proportions of acetal.

No references cited.